United States Patent
Tajiri

(10) Patent No.: US 12,539,691 B2
(45) Date of Patent: Feb. 3, 2026

(54) LAMINATE, INKJET PAPER, ADHESIVE LABEL

(71) Applicant: YUPO CORPORATION, Tokyo (JP)

(72) Inventor: Hirokazu Tajiri, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 339 days.

(21) Appl. No.: 18/038,055

(22) PCT Filed: Nov. 17, 2021

(86) PCT No.: PCT/JP2021/042231
§ 371 (c)(1),
(2) Date: May 22, 2023

(87) PCT Pub. No.: WO2022/113846
PCT Pub. Date: Jun. 2, 2022

(65) Prior Publication Data
US 2023/0364893 A1 Nov. 16, 2023

(30) Foreign Application Priority Data
Nov. 25, 2020 (JP) .................... 2020-195564

(51) Int. Cl.
*B32B 27/08* (2006.01)
*B32B 27/20* (2006.01)
(Continued)

(52) U.S. Cl.
CPC .............. *B32B 27/08* (2013.01); *B32B 27/20* (2013.01); *B32B 27/32* (2013.01); *B41M 5/502* (2013.01);
(Continued)

(58) Field of Classification Search
None
See application file for complete search history.

(56) References Cited

U.S. PATENT DOCUMENTS 4,837,075 A 6/1989 Dudley
5,968,994 A * 10/1999 Hashimoto ........... B29C 55/005
521/64

(Continued)

FOREIGN PATENT DOCUMENTS

EP 3 284 775 A1 2/2018
JP 1-105960 U 7/1989
(Continued)

OTHER PUBLICATIONS

International Search Report and Written Opinion issued in International Patent Application No. PCT/JP2021/042231, dated Jan. 18, 2022, along with an English translation thereof.

(Continued)

*Primary Examiner* — Chinessa T. Golden
(74) *Attorney, Agent, or Firm* — Greenblum & Bernstein, P.L.C.

(57) ABSTRACT

There is provided a laminate having excellent resistance to print removal and excellent abrasion resistance required in BS5609: 1986 and also providing the excellent ink dryness. The laminate includes a substrate layer (A) and a formed resin layer (B) including a first porous sub-layer (B1) and a second porous sub-layer (B2). The substrate layer (A), the second porous sub-layer (B2), and the first porous sub-layer (B1) are laminated in this order. The first porous sub-layer (B1) contains a propylene-based polymer (d1), an ethylene-based polymer (PE resin) or acrylonitrile-butadiene-styrene copolymer (ABS resin), and a filler (e1). The second porous sub-layer (B2) contains a propylene-based polymer (d2) and a filler (e2), and is free of a PE resin and an ABS resin. The content of the filler (e1) or (e2) in each porous sub-layer is 50 to 75 mass %.

11 Claims, 1 Drawing Sheet

(51) Int. Cl.
  *B32B 27/32* (2006.01)
  *B41M 5/50* (2006.01)
(52) U.S. Cl.
  CPC ..... *B32B 2250/242* (2013.01); *B32B 2255/10* (2013.01); *B32B 2255/26* (2013.01); *B32B 2264/104* (2013.01); *B32B 2270/00* (2013.01); *B32B 2307/516* (2013.01); *B32B 2307/518* (2013.01); *B32B 2307/554* (2013.01); *B32B 2307/718* (2013.01); *B32B 2307/75* (2013.01); *B32B 2519/00* (2013.01); *B32B 2554/00* (2013.01)

(56) References Cited

U.S. PATENT DOCUMENTS

| | | | |
|---|---|---|---|
| 10,360,823 | B2 | 7/2019 | Iwasawa et al. |
| 2006/0154002 | A1* | 7/2006 | Shibatani ............... B41M 5/502 428/32.24 |
| 2016/0260360 | A1 | 9/2016 | Ueda et al. |
| 2018/0133357 | A1* | 5/2018 | Takeda ............. A61F 13/15203 |
| 2019/0255823 | A1* | 8/2019 | Iwase ....................... B32B 7/02 |

FOREIGN PATENT DOCUMENTS

| | | |
|---|---|---|
| JP | 2000-290411 A | 10/2000 |
| JP | 2001-277449 A | 10/2001 |
| JP | 2016-169311 A | 9/2016 |
| WO | 2011/078267 A1 | 6/2011 |
| WO | 2015/072331 A1 | 5/2015 |
| WO | 2015/182435 A1 | 12/2015 |
| WO | 2017/057739 A1 | 4/2017 |

OTHER PUBLICATIONS

Extended European Search Report issued in European Patent Application No. 21897820.3, dated Oct. 14, 2024.

* cited by examiner

[Fig. 1]
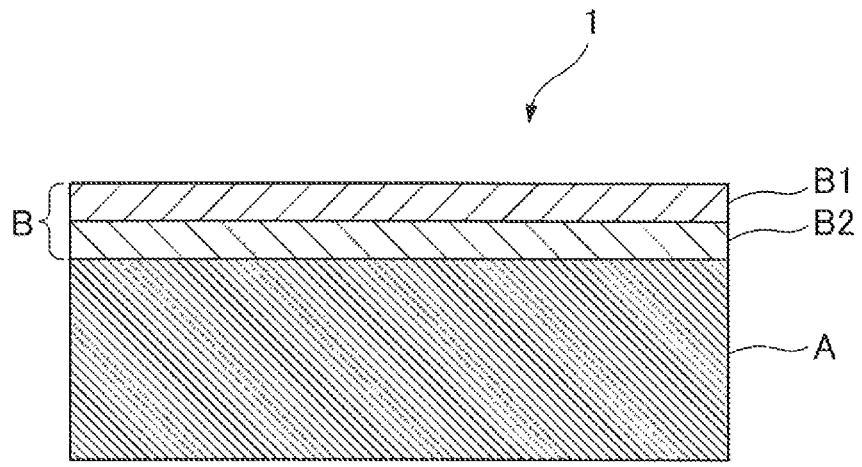
[Fig. 2]
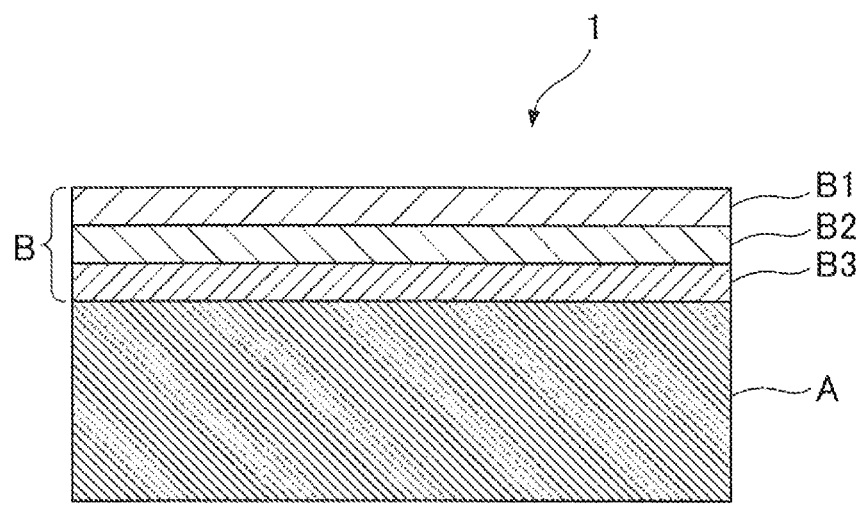

LAMINATE, INKJET PAPER, ADHESIVE LABEL

TECHNICAL FIELD

The present invention relates to a laminate, and an ink-jet printable paper and an adhesive label including the same.

BACKGROUND ART

For applying a label with a print to a container, various labels are studied according to the required properties. Examples of such labels include a coextruded plastic film label for in-mold labeling, the label including an adhesive layer (see patent literature 1). The adhesive layer includes an ethylene-based copolymer, and is a heat sealing layer that is to be activated by heat. Other examples include a label for in-mold labeling including an embossed heat-sealable resin layer (see patent literature 2), a thermoplastic resin film coated with a surface treatment agent including polyethyleneimine as the main component and having excellent printability (see patent literature 3), and a thermoplastic resin film having the excellent antistatic property as well as excellent printability or water resistance (see patent literature 4).

Regarding the classification of chemicals or the labeling for container for housing chemicals, the displaying manner in labels and contents about handling instructions and others have been conventionally left in the charge of each country, and been in a significantly different situation between countries.

However, chemicals have been exported and imported across borders recently. It has been recognized that there is a need for a globally harmonized method for classifying and labelling chemical substances, in order to produce, use, transport, process, or dispose of chemical substances in safety regardless of countries. As a result, the United Nations adopted the document of The Globally Harmonized System of Classification and Labelling of Chemicals (GHS).

Regarding labels in accordance with this GHS document (hereinafter, referred to as GHS labels), if a substance or mixture is determined (classified) as hazard, for example, information about the hazard and others must be displayed on a label thereof. Accordingly, the GHS labels require the rustproof property, for example. Patent literature 5 discloses a rustproof film exhibiting an excellent rustproofing effect and enabling visual confirmation of a content from the outside.

CITATION LIST

Patent Literature

Patent Literature 1: U.S. Pat. No. 4,837,075 A
Patent Literature 2: JP H1-105960 U
Patent Literature 3: JP 2000-290411 A
Patent Literature 4: WO 2015/072331
Patent Literature 5: JP 2016-169311 A

SUMMARY OF INVENTION

Technical Problem

In addition to the above, the GHS labels require other various properties. One of standards that specify such properties is BS5609: 1986, which is a British Standard. According to this British Standard, the GHS labels require label performance for the permanence and durability of the label base material and the adhesive in the seawater-immersing test for 3 months (section 2), and also print performance against artificially weathering, the tape-peeling test, and the test for the abrasion resistance (section 3).

Therefore, an object of the present invention is to provide a laminate having excellent resistance to print removal and excellent abrasion resistance required in BS5609: 1986, as the print performance when subjected to aqueous ink-jet printing, and also having the excellent ink dryness.

Solution to Problem

As a result of diligent studies, the present inventors have found that, by providing a formed resin layer including two porous sub-layers and using specific components for forming the porous sub-layers, respectively, there can be provided a laminate that is excellent in the ink dryness, resistance to print removal, and abrasion resistance in water, as the print performance when subjected to, for example, aqueous ink-jet printing to provide a printed layer, and thus have completed the present invention.

Specifically, the present invention is as follows.

(1) A laminate comprising a substrate layer (A) and a formed resin layer (B),
wherein
the substrate layer (A) comprises a thermoplastic resin film,
the formed resin layer (B) comprises a first porous sub-layer (B1) and a second porous sub-layer (B2),
the substrate layer (A), the second porous sub-layer (B2), and the first porous sub-layer (B1) are laminated in this order,
the first porous sub-layer (B1) comprises a propylene-based polymer (d1), an ethylene-based polymer or acrylonitrile-butadiene-styrene copolymer, and a filler (e1),
a content of the filler (e1) in the first porous sub-layer (B1) is 50 to 75 mass %,
the second porous sub-layer (B2) comprises a propylene-based polymer (d2) and a filler (e2), and is free of an ethylene-based polymer and an acrylonitrile-butadiene-styrene copolymer, and
a content of the filler (e2) in the second porous sub-layer (B2) is 50 to 75 mass %.

(2) The laminate according to [1], wherein the first porous sub-layer (B1) has a grammage of 0.5 to 10 g/m$^2$.

(3) The laminate according to [1] or [2], wherein the second porous sub-layer (B2) has a grammage of 6.0 g/m$^2$ or more.

(4) The laminate according to any one of [1] to [3], wherein the formed resin layer (B) has a Cobb absorptiveness of 10 cc/m$^2$ or more as measured with a 70 mass % ethanol aqueous solution as a test solvent in accordance with specification of JIS P 8140:1998.

(5) The laminate according to any one of [1] to [4], comprising a penetrant layer on a surface of the formed resin layer (B).

(6) The laminate according to any one of [1] to [5], wherein the first porous sub-layer (B1) has a porosity of 40 to 90%.

(7) The laminate according to any one of [1] to [6], wherein the second porous sub-layer (B2) has a porosity of 40 to 90%.

(8) The laminate according to any one of [1] to [7], wherein the formed resin layer (B) further comprises a formation-supporting sub-layer (B3), and the substrate layer (A), the formation-supporting sub-layer (B3), the second porous sub-layer (B2), and the first porous sub-layer (B1) are laminated in this order.

(9) Ink-jet printable paper comprising the laminate according to any one of [1] to [8].

(10) An adhesive label comprising:
the laminate according to any one of [1] to [8]; and
a pressure-sensitive adhesive layer (C) on a face of the substrate layer (A) of the laminate opposite from the formed resin layer (B).

Advantageous Effects of Invention

According to the present invention, there can be provided a laminate having excellent resistance to print removal and excellent abrasion resistance required in BS5609: 1986, as the print performance when subjected to aqueous ink-jet printing, and also having the excellent ink dryness.

BRIEF DESCRIPTION OF DRAWINGS

FIG. 1 is a cross-sectional view illustrating an example of the configuration of the laminate according to the present embodiment.

FIG. 2 is a cross-sectional view illustrating another example of the configuration of the laminate according to the present embodiment.

DESCRIPTION OF EMBODIMENTS

The laminate of the present invention, and an ink-jet printable paper and an adhesive label including the laminate will now be described in detail. The following descriptions are for examples (typical examples) of the present invention, and the present invention is not limited thereto.

In the descriptions below, the recitation "(meth)acryl" indicates both of acryl and methacryl.

[Laminate]

The laminate of the present invention comprises a substrate layer (A) and a formed resin layer (B) on at least one face of the substrate layer (A). The formed resin layer (B) comprises a first porous sub-layer (B1) and a second porous sub-layer (B2), and the second porous sub-layer (B2) and the first porous sub-layer (B1) are laminated in this order from the substrate layer (A) side.

FIG. 1 is a cross-sectional view illustrating one embodiment of the laminate of the present invention.

The laminate 1 illustrated in FIG. 1 includes a substrate layer (A) and a formed resin layer (B) on one face of the substrate layer (A). The formed resin layer (B) includes a first porous sub-layer (B1) and a second porous sub-layer (B2). The substrate layer (A), the second porous sub-layer (B2), and the first porous sub-layer (B1) are laminated in this order.

Each of these layers will be described in detail below.

(Substrate Layer (A))

The substrate layer (A) can impart the strength (stiffness) to the laminate. As the substrate layer (A), a thermoplastic resin film excellent in the mechanical strength is used.

<Thermoplastic Resin>

Examples of the thermoplastic resin used for the substrate layer (A) include an olefin-based polymer, a polyamide resin, a polyester resin, a polycarbonate resin, a polystyrene resin, a poly(meth)acrylate resin, a polyvinylchloride resin, and a mixed resin thereof. Among these, an olefin-based polymer is preferable in view of water resistance and solvent resistance. The thermoplastic resin used for the substrate layer (A) is preferably the same type as of the thermoplastic resin used for the formed resin layer (B), because the adhesion to the formed resin layer (B) is excellent to result in improved durability of the laminate.

As the olefin-based polymer, a propylene-based polymer, an ethylene-based polymer, or the like is preferably used.

Examples of the propylene-based polymer include: a propylene homopolymer, such as isotactic homopolypropylene and syndiotactic homopolypropylene, which are obtained by homopolymerization of propylene; and a propylene copolymer obtained by copolymerizing propylene as a main component with, for example, an α-olefin such as ethylene, 1-butene, 1-hexene, 1-heptene, 1-octene, or 4-methyl-1-pentene. The propylene copolymer may be a bipolymer or a multipolymer such as a ter- or higher-polymer, and may be a random copolymer or a block copolymer.

Examples of the ethylene-based polymer include: high density polyethylene, medium density polyethylene, linear low density polyethylene; a copolymer obtained by copolymerizing ethylene and the like as a main component with an α-olefin such as propylene, butene, hexene, heptene, octene, or 4-methyl-pentene-1; maleic acid-modified ethylene/vinyl acetate copolymer, ethylene/vinyl acetate copolymer, ethylene/acrylic acid copolymer, ethylene/alkyl acrylate copolymer, ethylene/alkyl methacrylate copolymer, a metal salt of ethylene/methacrylate copolymer (metal may be, for example, zinc, aluminum, lithium, sodium, or potassium), ethylene/cyclic olefin copolymer, and maleic acid-modified polyethylene.

Among the olefin-based polymers described above, the propylene homopolymer or the high density polyethylene is preferable in view of moldability and the cost, and it is more preferable to use the propylene homopolymer and the high density polyethylene in combination.

The thermoplastic resins described above may be used singly or in combinations of two or more thereof.

<Other Components>

The thermoplastic resin film serving as the substrate layer (A) may optionally include known additives, if necessary. Examples of the additives include an antioxidant, a light stabilizer, a UV absorber, a dispersant for inorganic filler, a nucleating agent, an anti-blocking agent, a plasticizer, a slip agent such as fatty acid amides, a dye, a pigment, a mold release agent, and known auxiliaries such as a flame retardant.

The substrate layer (A) preferably includes the antioxidant, the light stabilizer, or the like in view of enhancing the outdoor durability.

Examples of the antioxidant include a sterically hindered phenolic antioxidant, a phosphorus antioxidant, or an amine antioxidant.

Examples of the light stabilizer include a sterically hindered amine light stabilizer, a benzotriazole light stabilizer, or a benzophenone light stabilizer.

The contents of the antioxidant and the light stabilizer used are each preferably within the range from 0.001 to 1 mass % based on the mass of the substrate layer (A).

The substrate layer (A) may include a filler as long as the strength thereof is not impaired. The substrate layer (A) may be a non-stretched film, or may be a stretched film in view of increasing the strength. By using a stretched film of a thermoplastic resin including a filler as the substrate layer (A), the stiffness, whiteness and opacity of the substrate layer (A) can be adjusted according to the purpose. As the filler, any of fillers listed for the formed resin layer (B), which will be described hereinafter, may be used, and among others, an inorganic filler is preferable. The fillers in the substrate layer (A) and the formed resin layer (B) may be the same type, or may be different types.

The thickness of the substrate layer (A) may be selected as appropriately according to the thickness of the formed resin layer (B) and the use and purpose of the laminate. Generally, the thickness of the substrate layer (A) is preferably 15 μm or more, more preferably 20 μm or more, and even more preferably 30 μm or more, in view of obtaining the sufficient stiffness. The thickness of the substrate layer (A) is preferably 400 μm or less, more preferably 300 μm or less, and even more preferably 200 μm or less, in view of ease of handling in printing.

(Formed Resin Layer (B))

The formed resin layer (B) comprises the first porous sub-layer (B1), which provides the surface of the formed resin layer (B), and the second porous sub-layer (B2).

Preferably, the formed resin layer (B) further includes a formation-supporting sub-layer (B3) between the substrate layer (A) and the second porous sub-layer (B2).

FIG. 2 is a cross-sectional view illustrating an example of the laminate in the case where the laminate has the formation-supporting sub-layer (B3).

In the laminate 1 illustrated in FIG. 2, the formation-supporting sub-layer (B3) is interposed between the substrate layer (A) and the second porous sub-layer (B2). In other words, the substrate layer (A), the formation-supporting sub-layer (B3), the second porous sub-layer (B2), and the first porous sub-layer (B1) are laminated in this order.

The first porous sub-layer (B1) and the second porous sub-layer (B2) each contain a thermoplastic resin and a filler.

The porous sub-layers (B1) and (B2) each contain a propylene-based polymer as the thermoplastic resin. For the purpose of distinguishing the propylene-based polymers and the fillers of the porous sub-layers from each other, the propylene-based polymer contained in the first porous sub-layer (B1) is referred to as the propylene-based polymer (d1) while that in the second porous sub-layer (B2) is referred to as the propylene-based polymer (d2), and the filler contained in the first porous sub-layer (B1) is referred to as the filler (e1) while that in the second porous sub-layer (B2) is referred to as the filler (e2).

(First Porous Sub-Layer (B1))

The first porous sub-layer (B1) contains the propylene-based polymer (d1), an ethylene-based polymer or acrylonitrile-butadiene-styrene copolymer (ABS resin), and the filler (e1).

«Propylene-Based Polymer (d1)»

As the propylene-based polymer (d1) to be contained in the first porous sub-layer (B1), the same as described in the section "Thermoplastic Resin" for the substrate layer (A) can be used.

Examples thereof include a propylene homopolymer, such as isotactic homopolypropylene and syndiotactic homopolypropylene, which are obtained by homopolymerization of propylene; and a propylene copolymer obtained by copolymerizing propylene as a main component with, for example, an @-olefin such as ethylene, 1-butene, 1-hexene, 1-heptene, 1-octene, or 4-methyl-1-pentene. The propylene copolymer may be a bipolymer or a multipolymer such as a ter- or higher-polymer, and may be a random copolymer or a block copolymer. These may be used singly or in combinations of two or more thereof, and the propylene homopolymer is preferably used in view of the formation of pores.

«Ethylene-Based Polymer or Acrylonitrile-Butadiene-Styrene Copolymer (ABS Resin)»

The first porous sub-layer (B1) preferably contains a resin that is incompatible with the propylene-based resin (d1) and has a lower melting point than that of the propylene-based resin (d1). Specific examples of such a resin include an ethylene-based polymer and an acrylonitrile-butadiene-styrene copolymer (ABS resin) (hereinafter, these resins are collectively referred to as "incompatible resin"). Due to the incompatible resin contained, large pores can be formed preferentially at the interface between the incompatible resin and the propylene-based polymer (d1) when stretched to increase the porosity of the layer. The pores tend to extend in the thickness direction and connect with each other, and accordingly, the ink permeability of the first porous sub-layer (B1) can be increased. Also, the first porous sub-layer (B1) has a small mechanical strength and can be easily peeled, and accordingly, great resistance to print removal of the printed area can be achieved as described later.

Among the incompatible resins, the ethylene-based polymer is preferable in view of prevention of heat degradation in molding.

«Ethylene-Based Polymer»

As the ethylene-based polymer contained in the first porous sub-layer (B1), the same as described in the section Thermoplastic Resin in Substrate Layer (A) hereinbefore can be used.

Examples thereof include: high density polyethylene, medium density polyethylene, linear low density polyethylene; a copolymer obtained by copolymerizing ethylene and the like as a main component with an α-olefin such as propylene, butene, hexene, heptene, octene, or 4-methyl-pentene-1; maleic acid-modified ethylene/vinyl acetate copolymer, ethylene/vinyl acetate copolymer, ethylene/acrylic acid copolymer, ethylene/alkyl acrylate copolymer, ethylene/alkyl methacrylate copolymer, a metal salt of ethylene/methacrylate copolymer (metal may be, for example, zinc, aluminum, lithium, sodium, or potassium), ethylene/cyclic olefin copolymer, and maleic acid-modified polyethylene.

Among these, the high density polyethylene is preferable in view of ease of achieving large porosity in stretching the film.

«Filler (e1)»

As the filler (e1) to be contained in the first porous sub-layer (B1), organic fillers and inorganic fillers can be used singly or in combination. When a thermoplastic resin composition including the filler (e1) is stretched, a large number of fine pores with the particle of the filler (e1) as a nucleus can be formed in the thermoplastic resin film to obtain a porous sub-layer with a large number of pores.

«Inorganic Filler»

Examples of the inorganic filler that can be used for the first porous sub-layer (B1) include, but not particularly limited to, inorganic particles of heavy calcium carbonate, light calcium carbonate, calcined clay, talc, titanium oxide, barium sulfate, alumina, silica, zinc oxide, zeolite, mica, glass fiber, hollow glass beads, or the like. Among these, heavy calcium carbonate, calcined clay, diatomaceous earth, or the like is preferable, because they are inexpensive and facilitate the formation of many pores with ease of controlling the porosity when stretching the resin composition for forming the porous sub-layer. Particularly, heavy calcium carbonate or light calcium carbonate are preferable because the average particle size or particle size distribution thereof is easily adjusted to fall within a range for easily forming pores. The above-described inorganic particles can be used singly or in combinations of two or more thereof.

«Organic Filler»

The organic filler that can be used for the first porous sub-layer (B1) is not particularly limited, and preferably organic particles that is incompatible with the thermoplastic resin, has a melting point or a glass transition temperature higher than that of the thermoplastic resin, and is uniformly dispersed under the conditions for melt-kneading of the thermoplastic resin. Examples thereof include organic particles of polyethylene terephthalate, polybutylene terephthalate, polyethylene naphthalate, polystyrene, polyamide, polycarbonate, polyethylene sulfide, polyphenylene sulfide, polyimide, polyetherketone, polyetheretherketone, polymethylmethacrylate, poly-4-methyl-1-pentene, cyclic olefin homopolymer, a copolymer of cyclic olefin and ethylene, or the like. Fine particles of a thermosetting resin such as melamine resin may also be used, or it is also preferable to crosslink a thermoplastic resin to convert it into an insoluble form.

<Hydrophobic Filler>

The filler (e1) of the first porous sub-layer (B1) preferably include, as a part or the whole thereof, a filler that has undergone surface treatment with paraffin or a fatty acid having 12 to 22 carbon atoms or a salt thereof to have a hydrophobic surface, and particularly preferably a hydrophobic filler obtained by surface treatment with a fatty acid having 12 to 22 carbon atoms or a salt thereof.

When a hydrophobic filler is used as the filler (e1) in the first porous sub-layer (B1), generation of gum residues can be suppressed, for example, in co-extrusion of a laminate including the sub-layer.

Examples of the fatty acid having 12 to 22 carbon atoms used for the surface treatment include lauric acid, myristic acid, palmitic acid, stearic acid, arachidic acid, behenic acid, oleic acid, linoleic acid, linolenic acid, and eleostearic acid.

The method for the surface treatment is not particularly limited, and for example, the surface treatment can be carried out by introducing an aqueous solution containing a treatment agent into a slurry containing the inorganic particles or organic particles described above. In this way, a surface-treated filler, specifically, a hydrophobic filler having a layer containing a fatty acid having 12 to 22 carbon atoms or a salt thereof on the surface can be obtained.

The average particle diameter of the filler (e1) contained in the first porous sub-layer (B1) is preferably 0.1 μm or more, more preferably 0.3 μm or more, and preferably 5 μm or less, more preferably 2 μm or less, in view of formation of pores. When the average particle diameter of the filler (e1) is 0.1 μm or more, pores are easily formed to easily increase the aqueous pigmented ink permeability. When the average particle diameter of the filler (e1) is 5 μm or less, formation of bulky pores are easily suppressed to easily enhance the clearness of an ink-jet printed image.

«Contents»

The content of the propylene-based polymer (d1) in the first porous sub-layer (B1) is preferably 5 mass % or more, more preferably 10 mass % or more, and preferably 50 mass % or less, more preferably 30 mass % or less, in view of ease of stretching the propylene-based polymer (d1) in a non-melted state to obtain a sufficient strength of the sub-layer.

The content of the incompatible resin in the first porous sub-layer (B1) is preferably 5 mass % or more, more preferably 10 mass % or more, and preferably 50 mass % or less, more preferably 30 mass % or less, in view of ease of stretching the incompatible resin in a melted state to facilitate the formation of fibrillated pores form to thereby improve the resistance to print removal.

The ratio between the content of the propylene-based polymer (d1) and that of the incompatible resin, propylene-based polymer (d1): incompatible resin, in the first porous sub-layer (B1) is preferably 1:2 to 2:1.

The content of the filler (e1) in the first porous sub-layer (B1) is 50 mass % or more, preferably 55 mass % or more, and more preferably 60 mass % or more, in view of enhancing the migration of a solvent of an ink to improve the ink dryness. The content is 75 mass % or less and preferably 70 mass % or less, in view of granulation of the resin composition for forming the first porous sub-layer (B1) and formation stability.

The grammage of the first porous sub-layer (B1) is preferably 0.5 g/m² or more, more preferably 0.8 g/m² or more, even more 1.0 g/m² or more, and particularly preferably 3.0 g/m² or more, in view of resistance to print removal of the printed area. The grammage of the first porous sub-layer (B1) is preferably 10.0 g/m² or less, more preferably 8.0 g/m² or less, and even more preferably 6.0 g/m² or less, in view of resistance to print removal of the printed area.

The grammage of each sub-layer can be determined from the density and the thickness thereof. The grammage of a sub-layer can be controlled by the thickness thereof, the content and the average particle diameter of the filler, or the conditions for stretching the sub-layer containing the filler, including the stretch temperature and the stretch ratio.

The thickness of the first porous sub-layer (B1) is preferably 0.5 μm or more, more preferably 1.0 μm or more, and even more preferably 2.0 μm or more, in view of the grammage. The thickness of the first porous sub-layer (B1) is preferably 40 μm or less, more preferably 30 μm or less, and even more preferably 20 μm or less, in view of enhancing the migration of a solvent of an ink to maintain resistance to print removal.

The porosity of the first porous sub-layer (B1) is preferably 40% or more, more preferably 50% or more, and even more preferably 60% or more, in view of enhancing the migration of a solvent of an ink to improve the ink dryness. The porosity is preferably 90% or less, and more preferably 80% or less, in view of abrasion resistance (resistance to abrasion with salt water).

The porosity can be controlled by the average particle diameter of the filler (e1), the chemical composition of the porous sub-layer containing the filler (e1), e.g., the ratio between the contents of the propylene-based polymer (d1), the incompatible resin, and the filler (e1), and the conditions for stretching, including the stretch temperature and the stretch ratio.

The porosity can be determined from the ratio of the area occupied by pores in a predetermined region in the cross-section of the porous layer observed under an electron microscope. Specifically, an arbitrary part of the film as the measurement target is cut out and embedded in an epoxy resin, followed by fixing. Then the resultant was cut with a microtome in the direction perpendicular to the face of the film as the measurement target, and mounted on the observation stage so that the cut surface serves as a surface to be observed. Gold, gold/palladium, or the like is vapor-deposited on the surface to be observed. Pores in the film are observed at an arbitrary magnification suitable for observing (e.g., a magnification factor of 500× to 3000×) under the electron microscope, and the image data of the observed region is captured. On the image data obtained, image processing is carried out using an image analysis system, and the percentage (%) of the area of pores in the predetermined region in the film is determined, which is used as the porosity (%). At this time, found values in observations at ten or more arbitrary points may be averaged to obtain the porosity.

«Other components»

The first porous sub-layer (B1) may contain known additives and resin components other than those described above, as long as the effect of the present invention is not imparted. Examples of the additives include those listed as <Other Components> in the section for the substrate layer (A). Examples of the resin components include an olefin-based polymer other than those described above and an acid-modified product of an olefin-based polymer.

(Second Porous Sub-Layer (B2))

The second porous sub-layer (B2) contains the propylene-based polymer (d2) and the filler (e2). Unlike the first porous sub-layer (B1), the second porous sub-layer (B2) is free of an ethylene-based polymer and an acrylonitrile-butadiene-styrene copolymer (ABS resin).

The second porous sub-layer (B2) is a layer having a porous structure as with the first porous sub-layer (B1), and functions mainly as an ink-absorbing layer. In order to secure certain color fastness after printing due to the mechanism described below, the second porous sub-layer (B2) preferably has a strength for resisting a peeling strength, i.e., peeling resistance, compared with the first porous sub-layer (B1). Accordingly, the second porous sub-layer (B2) is a layer free from a resin incompatible with polypropylene that may cause decrease in the strength, specifically, an ethylene-based polymer or an ABS resin.

«Propylene-based polymer (d2)»

As the propylene-based polymer (d2), the same polymers as those listed as examples of the propylene-based polymer (d1) in the section for the first porous sub-layer (B1) can be used, and the preference is also the same.

The propylene-based polymer (d2) may be the same polymer as the propylene-based polymer (d1) or may be different polymer therefrom.

«Filler (e2)»

As the filler (e2) to be contained in the second porous sub-layer (B2), the same filler as those listed as examples of the filler (e1) in the section for the first porous sub-layer (B1) can be used, and the preference is also the same. The filler (e2) may be the same or different from the filler (e1).

Although the hydrophobic filler may be used also for the second porous sub-layer (B2), it is preferable that the hydrophobic filler should not be used in a large amount, in view of ink-absorbency.

On the other hand, the second porous sub-layer (B2) may contain, as the filler (e2), a cationic filler that has obtained by surface treatment with a cationic polymer.

Examples of the cationic polymer include a nitrogen-containing (meth)acrylic copolymer, an ethyleneimine polymer, a water-soluble polymer having a tertiary amine structure, quaternary amine structure or phosphonium salt structure, and a cationized vinyl polymer obtained by modifying a water-soluble polymer such as polyvinylpyrrolidone or polyvinyl alcohol. These may be used singly or in combinations of two or more thereof. Among these, a cationic polymer having a tertiary or higher amine structure, i.e., a tertiary amine structure or a quaternary amine structure is preferable.

The amount of the cationic polymer adhered is preferably 0.1 to 5% mass % per 100 parts by mass of the filler. Adjustment of the content of the cationic polymer enables adjustment of the water absorption and permeability of the porous sub-layer.

The method for the surface treatment is not particularly limited. For example, the surface treatment can be carried out by introducing an aqueous cationic polymer solution when wet-grinding the raw material of inorganic particles. Alternatively, the surface treatment can be carried out by stirring organic particles in an aqueous cationic polymer solution and drying the resulting organic particles. In this way, a filler surface-treated with a cationic polymer, specifically, a cationic filler can be obtained.

«Other Components»

The second porous sub-layer (B2) may contain known additives and resin components other than those described above, as long as the effect of the present invention is not imparted. Examples of the additives include those listed as <Other Components> in the section for the substrate layer (A). Examples of the resin components include an olefin-based polymer other than those described above and an acid-modified product of an olefin-based polymer.

«Contents»

The content of the propylene-based polymer (d2) in the second porous sub-layer (B2) is preferably 5 mass % or more, more preferably 10 mass % or more, and preferably 60 mass % or less, more preferably 50 mass % or less, in view of ease of stretching the propylene-based polymer (d2) in a non-melted state to obtain a sufficient strength of the sub-layer.

The content of the filler in the second porous sub-layer (B2) is 50 mass % or more, preferably 55 mass % or more, and more preferably 60 mass % or more, in view of receiving a solvent of an ink to improve the ink dryness. The content is 75 mass % or less, and preferably 70 mass % or less, in view of granulation of the resin composition for forming the second porous sub-layer (B2) and formation stability.

The grammage of the second porous sub-layer (B2) is preferably 4.0 g/m$^2$ or more, more preferably 6.0 g/m$^2$ or more, even more preferably 7.0 g/m$^2$ or more, and particularly preferably 9.0 g/m$^2$ or more, in view of the amount of the solvent received and the dryness. The grammage of the second porous sub-layer (B2) is preferably 20.0 g/m$^2$ or less, and more preferably 15.0 g/m$^2$ or less, in view of the cost of producing the laminate.

The thickness of the second porous sub-layer (B2) is preferably 6 μm or more, more preferably 8 μm or more, and even more preferably 10 μm or more, in view of the grammage. The thickness of the second porous sub-layer (B2) is preferably 40 μm or less, and more preferably 30 μm or less.

The porosity of the second porous sub-layer (B2) is preferably 40% or more, more preferably 50% or more, and even more preferably 60% or more, in view of receiving the solvent of an ink to improve the ink dryness. The porosity is preferably 90% or less, and more preferably 80% or less, in view of preventing a material failure when a peeling strength is applied.

The porosity can be controlled by the average particle diameter of the filler (e2), the chemical composition of the second porous sub-layer (B2), and the conditions for stretching, including the stretch temperature and the stretch ratio.

The method for determining the porosity is the same as described for the first porous sub-layer (B1).

A printed material obtained by performing aqueous pigmented ink-jet printing on the surface on the first porous sub-layer (B1) side of the laminate of the present invention has great color fastness. Specifically, the printed material can achieve favorable color fastness in the tape-peeling test and the test for the abrasion resistance specified in the section 3 in BS5609: 1986, which is a British Standard.

The detailed mechanism is not clear but is probably considered as follows. The first porous sub-layer (B1), which contains not only the propylene-based polymer but also an ethylene-based polymer or acrylonitrile-butadiene-styrene copolymer (ABS resin) as the resin component, tends to have pores extending in the thickness direction inside thereof. Accordingly, it is supposed that an aqueous pigmented ink fed on the surface on the first porous sub-layer (B1) side passes through the first porous sub-layer (B1), and that the greater part of the pigment contained in the ink is present at the vicinity of the interface between the first porous sub-layer (B1) and the second porous sub-layer (B2) and the surface moiety of the second porous sub-layer (B2). When such a printed material is subjected to the above-mentioned tape-peeling test, the first porous sub-layer (B1), which has a small mechanical strength (i.e., is brittle), is broken in itself, and peeled and removed from the surface of the second porous sub-layer (B2), and it is considered that the greater part of the pigment remains in and around the surface moiety of the second porous sub-layer (B2) so that the image formed by the ink remains. Thus, great resistance to print removal can be achieved. In this context, when the grammage of the first porous sub-layer (B1) is 0.5 g/m$^2$ or more, the ink in the printed area is unlikely to dry in the surface of the first porous sub-layer (B1), and the image is unlikely to peel in the tape-peeling test, which is preferable. On the other hand, when the grammage of the first porous sub-layer (B1) is 10.0 g/m$^2$ or less, the pigment of the ink penetrates deeply to the vicinity of the interface between the first porous sub-layer (B1) and the second porous sub-layer (B2) and to the surface moiety of the second porous sub-layer (B2), and the image is thus easily prevented from peeling and removal together with the first porous sub-layer (B1) in the tape-peeling test.

The first porous sub-layer (B1) contains the propylene-based polymer (d1) and the incompatible resin whereas the second porous sub-layer (B2) is free of incompatible resin, whereby the shapes of the pores in the two sub-layers are controlled as appropriate. As a result, no material failure occurs in the second porous sub-layer (B2), and material failure occurs only in the first porous sub-layer (B1) in the tape-peeling test.

Because the ink penetrates through the pores in the first porous sub-layer (B1) and the second porous sub-layer (B2), the printed area has improved abrasion resistance in water. Accordingly, a favorable result can be obtained in the test for the abrasion resistance in the section 3 mentioned above.

(Formation-Supporting Sub-Layer (B3))

The formed resin layer (B) may include a formation-supporting sub-layer (B3) as a layer for supporting the first porous sub-layer (B1) and the second porous sub-layer (B2).

The formation-supporting sub-layer (B3) is effective as a layer for supporting the first porous sub-layer (B1) and the second porous sub-layer (B2) particularly in the case where the formed resin layer (B) is formed by co-extrusion. When the first porous sub-layer (B1) and the second porous sub-layer (B2) are co-extruded with the formation-supporting sub-layer (B3), the co-extrusion can be more stably achieved.

The formation-supporting sub-layer (B3) preferably contains an olefin-based polymer, and more preferably contains a propylene-based polymer. The formation-supporting sub-layer (B3) may also contain a filler. As the above-described components for the formation-supporting sub-layer (B3), the same polymer and filler as for the first porous sub-layer (B1) and the second porous sub-layer (B2) can be used.

The content of the olefin-based polymer in the formation-supporting sub-layer (B3) is preferably 40 mass % or more, more preferably 50 mass % or more, and preferably 95 mass % or less, more preferably 80 mass % or less, in view of ease of stretching the olefin-based polymer in a non-melted state to obtain a sufficient strength.

In the case where the formation-supporting sub-layer (B3) contains the filler, the content of the filler in the formation-supporting sub-layer (B3) is preferably 5 mass % or more, more preferably 20 mass % or more, and preferably 60 mass % or less, more preferably 50 mass % or less, in view of formation stability upon co-extrusion.

The formation-supporting sub-layer (B3) preferably has a thickness of 5 µm or more, more preferably 10 µm or more, and even more preferably 15 µm or more, in view of formation stability upon co-extrusion. The formation-supporting sub-layer (B3) preferably has a thickness of 100 µm or less, more preferably 70 µm or less, and even more preferably 60 µm or less, in view of avoiding an excessively thick laminate.

<Cobb Absorptiveness>

The Cobb absorptiveness of the formed resin layer (B) in the laminate of the present invention is preferably 10 cc/m$^2$ or more. The Cobb absorptiveness was measured in accordance with the specification in JIS P 8140:1998 for a contact time of 120 seconds with a 70 mass % aqueous ethanol solution as the test medium.

The formed resin layer (B) in the present invention includes the first porous sub-layer (B1) and the second porous sub-layer (B2), which each contain the resin component(s) of a specific chemical composition and a specific amount of the filler, preferably has a Cobb absorptiveness of 10 cc/m$^2$ or more. In this way, great resistance to print removal and abrasion resistance required of GHS labels as well as the excellent ink dryness are achieved.

The Cobb absorptiveness of the formed resin layer (B) in the present invention is more preferably 15 cc/m$^2$ or more.

<Method for Producing Laminate>

The method for producing the laminate of the present invention is not particularly limited, and the laminate can be produced by a common method.

For example, after a thermoplastic resin film constituting the substrate layer (A) is formed, a thermoplastic resin film constituting the formed resin layer (B) may be laminated thereon. Examples of the method for molding a film include casting in which a melted resin is extruded into a sheet form through a single layer or multilayer T-die or I-die, or the like connected to a screw extruder, for example; calendering, rolling, and inflation molding. Formation and lamination of films as the substrate layer (A) and the formed resin layer (B) may be concurrently carried out using a common technique, such as multi-dies technique involving use of a feed block and a multi-manifold or extrusion and lamination technique involving use of dies.

The formed resin layer (B) is preferably a co-extruded layer formed by co-extrusion of a film as the first porous sub-layer (B1) and a film as the second porous sub-layer (B2) (and a film as the formation-supporting sub-layer (B3), if needed). The adhesion strength between such sub-layers composing the formed resin layer (B) is larger than the adhesion strength between the formed resin layer (B) and another layer (e.g., the substrate layer (A)).

The thermoplastic resin film of the substrate layer (A) may be stretched before laminating the formed resin layer (B), or may be stretched after laminating. Since the formed resin layer (B) is thin, the formed resin layer (B) is stretched preferably after laminating it on the substrate layer (A), rather than stretch-molding of the single layer. Among others, the substrate layer (A) is preferably a biaxially stretched layer, because such a layer can impart an enhanced mechanical strength to the laminate including the same. The formed resin layer (B) is preferably a uniaxially stretched layer, because a fibrillated surface can be easily formed to improve resistance to print removal after aqueous pigmented ink-jet printing. It is more preferably that the substrate layer (A) and the formed resin layer (B) should be a biaxially stretched layer and a uniaxially stretched layer, respectively.

Examples of a stretching method include mechanical direction stretching in which the difference in the circumferential speed between rolls is utilized, cross direction stretching in which a tenter oven is utilized, sequentially biaxially stretching in which the above two are combined, rolling, simultaneously biaxially stretching by a combination of a tenter oven with a pantograph, and simultaneously biaxially stretching by a combination of a tenter oven with a linear motor. Other simultaneously biaxially stretching may also be used in which a molten resin is extruded into a tubular shape through a circular die connected to a screw extruder, followed by blowing air into the resultant (inflation molding).

In a case where the thermoplastic resin used is an amorphous resin, the stretching temperature at which the stretching is carried out is preferably equal to or higher than the glass transition temperature of the thermoplastic resin. In the case where the thermoplastic resin used is a crystalline resin, the stretching temperature is preferably in a range from the glass transition temperature of the amorphous moiety of the thermoplastic resin to the melting point of the crystalline moiety of the thermoplastic resin, and preferably a temperature lower than the melting point of the thermoplastic resin by 2 to 60° C. For example, in a case where a propylene homopolymer (melting point: 155 to 167° C.) is used, the stretching temperature is preferably 100 to 164° C., and in a case where a high density polyethylene (melting point: 121 to 134° C.) is used, the stretching temperature is preferably 70 to 133° C.

The stretching speed is not particularly limited, and is preferably within a range from 20 to 350 m/min in view of stable stretch-molding.

The stretch ratio can also be appropriately set in consideration with, for example, the characteristics of the thermoplastic resin used. For example, in a case where a propylene homopolymer or a propylene copolymer is used, the stretch ratio upon uniaxially stretching is generally about 1.2 or more, more preferably 2 or more, in terms of the lower limit, and generally 12 or less, more preferably 10 or less, in terms of the upper limit. The stretch ratio upon biaxially stretching, specifically the area stretch ratio, is generally 1.5 or more, more preferably 4 or more, in terms of the lower limit, and generally 60 or less, more preferably 50 or less, in terms of the upper limit. In a case where another thermoplastic resin is uniaxially stretched, the stretch ratio is generally 1.2 or more, more preferably 2 or more, in terms of the upper limit, and generally 10 or less, more preferably 5 or less, in terms of the lower limit. The stretch ratio upon biaxially stretching, specifically the area stretch ratio, is generally 1.5 or more, more preferably 4 or more, in terms of the lower limit, and generally 20 or less, more preferably 12 or less, in terms of the upper limit.

When the stretch ratio is within the above-described range, the targeted porosity and grammage are easily obtained so that the opacity is easily improved. In addition, the breakage of the laminate is unlikely to be caused so that stable stretch-molding tends to be achieved.

<Laminate Coated with Penetrant>

The laminate of the present invention may have a penetrant layer, which contains a penetrant, on the surface of the formed resin layer (B). Specifically, a penetrant-containing solution can be applied to the surface of the formed resin layer (B) and dried to thereby form a penetrant layer. By applying a penetrant-containing aqueous solution to the surface of the formed resin layer (B) and drying it, the penetrant adheres in the state where the penetrant penetrates a part of the formed resin layer (B), which is a porous layer. Such a penetrant layer can suppress blurring of an image printed on the surface on the formed resin layer (B) side.

Examples of the penetrant include a surfactant such as a nonionic surfactant, a cationic surfactant, an anionic surfactant, and an amphoteric surfactant. In the present invention, an anionic or nonionic surfactant is preferable, and particularly, a nonionic surfactant can be suitably used.

Examples of the nonionic surfactant include a surfactant selected from the group consisting of a sorbitan fatty acid ester, such as sorbitan monooleate, sorbitan monolaurate, sorbitan monostearate and sorbitan tristearate; a polyoxyalkylene sorbitan fatty acid ester, such as polyoxyethylene sorbitan trioleate; a glyceryl fatty acid ester such as glyceryl monooleate and glyceryl monostearate; a polyglyceryl fatty acid ester such as diglyceryl monooleate, diglyceryl sesquilaurate, tetraglyceryl monooleate and decaglyceryl monolaurate; a polyoxyalkylene alkyl ether such as polyoxyethylene lauryl ether; a polyoxyalkylene fatty acid ester such as polyethylene monolaurate and polyoxyethylene trioleate; a polyoxyethylene alkylphenol ether such as polyoxyethylene nonylphenyl ether; a pentaerythritol fatty acid ester such as pentaerythritol monostearate; a saccharose fatty acid ester such as saccharose laurate; a polyoxyethylene fatty acid amide such as polyoxyethylene oleamide; a fatty acid amine such as lauryldiethanolamine; and a fatty acid amide such as oleamide.

Among these, a polyoxyalkylene alkyl ether is particularly preferable in view of allowing the formed resin layer (B) to exhibit an appropriate ink-absorbing speed.

Although the reason is not clear, a nonionic surfactant, particularly a polyoxyalkylene alkyl ether does not exhibit the effect of suppressing the blurring even when it is applied to the surface of a porous layer not containing an ethylene-based polymer or acrylonitrile-butadiene-styrene copolymer. However, when it is applied to the surface of the formed resin layer (B) in the laminate of the present invention, that is, the surface of the first porous sub-layer (B1), which contains a propylene-based polymer (d1), an ethylene-based polymer or acrylonitrile-butadiene-styrene copolymer, and a filler (e1), the effect of the suppressing the blurring of the printed image is exhibited significantly.

The amount of the penetrant on the surface of the formed resin layer (B) is preferably 0.05 g/m$^2$ to 1.0 g/m$^2$, and more preferably 0.1 g/m$^2$ to 0.8 g/m$^2$, in terms of the solids content.

[Ink-Jet Printable Paper]

The ink-jet printable paper of the present invention includes the laminate described above.

[Printing on Laminate and Ink-Jet Printable Paper]

The laminate and ink-jet printable paper of the present invention have ink-jet printability, and various information, such as photos, figures, texts, and patterns, can be printed on the formed resin layer (B) by ink-jet technique. For printing, various inks for ink-jet printing can be used, including aqueous, solvent-based, and ultraviolet curable inks. Among others, the laminate and ink-jet printable paper of the present invention is excellent in printability with an aqueous pigmented ink, and cause less bleeding even upon multicolor printing to achieve bright ink-jet printing with high sharpness. In addition to or alternatively to ink-jet printing, recording can be performed thereon with a writing implement such as an aqueous or oil-based felt-tip pen, a fluorescent marker, or a pencil.

<Aqueous Pigmented Ink>

The aqueous pigmented ink contains, for example, water, a pigment, a dispersant, an aqueous organic solvent, or a surfactant. The aqueous ink herein refers to an ink in which water accounts for 60 mass % or more based on the medium component(s).

The contents of the components are usually as follows: pigment, about 0.2 to 10 mass %; dispersant, about 1.5 to 15 mass %; aqueous organic solvent, about 5 to 40 mass %; and surfactant, about 0.5 to 2 mass %; all based on the total mass (100 mass %) of the ink.

[Adhesive label]

The adhesive label of the present invention includes the laminate described above. The adhesive label of the present invention has a pressure-sensitive adhesive layer (C) on the face of the substrate layer (A) of the laminate described above opposite from the formed resin layer (B). The pressure-sensitive adhesive layer (C) can be formed from known materials by a known method, and specifically can be formed from the materials by the method disclosed in WO 2019/189699, for example.

The adhesive label may further have a release sheet on the face of the pressure-sensitive adhesive layer (C) opposite from the substrate layer (A) side.

Printing can be performed on the surface of the formed resin layer (B) of the laminate of the adhesive label of the present invention, so that the adhesive label can be used for various application. Particularly, aqueous pigmented ink-jet printing can be performed on the surface of the first porous sub-layer (B1) side of the laminate to thereby provide a label providing an excellent ink dryness and having resistance to print removal as well as great abrasion resistance even in salt water. Such a label can be suitably used as a label to be attached to, for example, a hazardous material to be handled at sea.

EXAMPLES

The present invention will be further specifically described by way of Examples below; however, the present invention is not limited to Examples below as long as it does not depart from the scope of the technical concept thereof. In Examples, "part(s)," "%," and the like are by mass, unless otherwise noticed.

[Materials]

Materials used in Examples and Comparative Examples were as shown below.

<Thermoplastic resin>

Propylene homopolymer PP-1 (Product name: MA3U, manufactured by Japan Polypropylene Corporation; MFR: 15 g/10 min (230° C., 2.16 kg load); melting point 167° C. (Peak temperature in DSC))

Propylene homopolymer PP-2 (Product name: NOVATEC PP MA3H, manufactured by Japan Polypropylene Corporation; MFR: 10 g/10 min (230° C., 2.16 kg load); melting point 164° C. (Peak temperature in DSC); density: 0.9 g/cm$^3$)

Propylene homopolymer PP-3 (Product name: NOVATEC PP FY6H, manufactured by Japan Polypropylene Corporation; MFR: 1.9 g/10 min (230° C., 2.16 kg load); melting point 164° C. (Peak temperature in DSC); density: 0.9 g/cm$^3$)

High density polyethylene PE-1 (product name: NOVATEC HD HJ590N, manufactured by Japan Polyethylene Corporation; MFR: 40 g/10 min (190° C., 2.16 kg load); melting point 133° C. (Peak temperature in DSC); density: 0.96 g/cm$^3$))

High density polyethylene PE-2 (product name: NOVATEC HD HJ490, manufactured by Japan Polyethylene Corporation; MFR: 20 g/10 min (190° C., 2.16 kg load); melting point 133° C. (Peak temperature in DSC); density: 0.96 g/cm$^3$)

<Inorganic filler>

Heavy calcium carbonate powder F-1 (product name: SOFTON 1800, manufactured by BIHOKU FUNKA KOGYO CO., LTD.; average particle diameter: 1.25 µm)

<Cationic Inorganic Filler>

Amine-modified calcium carbonate powder F-2 (heavy calcium carbonate having a surface treated with the surface treatment agent described below; average particle diameter: 1.5 µm)

«Surface Treatment Agent»

A surface treatment agent was produced in the following manner according to Production Example 2 in JP 2004-68017A. To a reactor equipped with a reflux condenser, a thermometer, a dropping funnel, a stirrer, and a gas inlet tube, 500 parts by mass of diallylamine hydrochloride (aqueous solution in 60% concentration), 13 parts by mass of acrylamide (aqueous solution in 40% concentration), and 40 parts by mass of water were placed, and the temperature of the system was raised to 80° C. while allowing nitrogen gas to flow thereinto. 30 parts by mass of ammonium persulfate (aqueous solution in 25% concentration) as a polymerization initiator was dropped through the dropping funnel over 4 hours under stirring. The reaction was continued for 1 hour after completion of the dropping to thereby obtain a pale yellow viscous liquid. 50 g of the liquid was weighed and poured into 500 ml of acetone to thereby generate white precipitation. The precipitation was collected by filtration, washed thoroughly with 100 ml of acetone twice, and then dried in vacuo to thereby obtain a polymer in the form of a white solid (aqueous cationic copolymer). The copolymer was used as the surface treatment agent. The weight average molecular weight of the resulting polymer was determined by GPC and found to be 55000.

<Dispersant>

Oleic acid D-1 (product name: LUNAC O-V, manufactured by Kao Corporation)

TABLE 1

| Material | Abbreviation | Name | Contents |
|---|---|---|---|
| Thermoplastic Resin | PP-1 | Propylene Homopolymer | Product Name: MA3U, Manufactured by Japan Polypropylene Corporation MFR: 15 g/10 min (230° C., 2.16 kg Load), Melting Point: 167° C. (Peak Temperature in DSC) |

TABLE 1-continued

| Material | Abbreviation | Name | Contents |
|---|---|---|---|
| | PP-2 | Propylene Homopolymer | Product Name: NOVATECH PP MA3H, Manufactured by Japan Polypropylene Corporation MFR: 10 g/10 min (230° C., 2.16 kg Load), Melting Point: 164° C. (Peak Temperature in DSC), Density: 0.9 g/cm$^3$ |
| | PP-3 | Propylene Homopolymer | Product Name: NOVATECH PP FY6H, Manufactured by Japan Polypropylene Corporation MFR: 1.9 g/10 min (230° C., 2.16 kg Load), Melting Point: 164° C. (Peak Temperature in DSC), Density: 0.9 g/cm$^3$ |
| | PE-1 | High Density Polyethylene | Product Name: NOVATECH HD HJ590N, Manufactured by Japan Polyethylene Corporation MFR: 40 g/10 min (190° C., 2.16 kg Load), Melting Point: 133° C. (Peak Temperature in DSC), Density: 0.96 g/cm$^3$ |
| | PE-2 | High Density Polyethylene | Product Name: NOVATECH HD HJ490N, Manufactured by Japan Polyethylene Corporation MFR: 20 g/10 min (190° C., 2.16 kg Load), Melting Point: 133° C. (Peak Temperature in DSC), Density: 0.96 g/cm$^3$ |
| Inorganic Filler | F-1 | Heavy Calcium Carbonate Powder | Product Name: SOFTON 1800, manufactured by BIHOKU FUNKA KOGYO CO., LTD., Average Particle Size: 1.25 μm |
| Cationic Inorganic Filler | F-2 | Amine-modified Calcium Carbonate Powder | Surface-Treated Calcium Carbonate obtained in Production Example 2 in JP2004-68017AAverage Particle Size: 1.5 μm |
| Dispersant | D-1 | Oleic Acid | Product Name: Lunac O-V, Manufactured by Kao Corporation |

Example 1

(Production of Film Uniaxially Stretched in Mechanical Direction)

15 parts by mass of propylene homopolymer PP-2 (product name: NOVATEC PP MA3H, manufactured by Japan Polypropylene Corporation), 59.5 parts by mass of propylene homopolymer PP-3 (product name: NOVATEC PP FY6H, manufactured by Japan Polypropylene Corporation), 9.5 parts by mass of high density polyethylene PE-1 (product name: NOVATEC HD HJ590N, manufactured by Japan Polypropylene Corporation), 16 parts by mass of heavy calcium carbonate powder F-1 (product name: SOFTON 1800, manufactured by BIHOKU FUNKA KOGYO CO., LTD.), and 0.1 parts by mass of oleic acid D-1 as a dispersant (product name: LUNAC O-V, manufactured by Kao Corporation) were blended and stirred/mixed using a mixer to obtain a resin composition A-1.

Using an extruder set at 250° C., the above-described resin composition A-1 was melt-kneaded and then extruded into a sheet shape through a die, and the resultant was cooled to 70° C. using a cooler to thereby obtain a non-stretched monolayer film. The non-stretched film was reheated to 145° C. and then stretched 5 times in the mechanical direction by utilizing the difference in the circumferential speed between the rolls to thereby obtain a film uniaxially stretched in the mechanical direction.

The materials composing the resin composition A-1 and the blending ratios of the materials (parts by mass) are shown in Table 2 below. The abbreviations in Table 2 are the same as those described in Table 1.

TABLE 2

| Material | Abbreviation | Blending Ratio (Parts by mass) |
|---|---|---|
| Thermoplastic Resin | PP-2 | 15.0 |
| | PP-3 | 59.5 |
| | PE-1 | 9.5 |
| Inorganic Filler | F-1 | 16.0 |
| Dispersant | D-1 | 0.1 |

(Production of Laminate (Stretched Tetralayer Film))

<First Porous Sub-Layer (B1)>

20 parts by mass of propylene homopolymer PP-1 (product name: MA3U, manufactured by Japan Polypropylene Corporation), 20 parts by mass of high density polyethylene PE-2 (product name: NOVATEC HD HJ490, manufactured by Japan Polyethylene Corporation) as an incompatible resin, and 60 parts by mass of heavy calcium carbonate powder F-1 (product name: SOFTON 1800, manufactured by BIHOKU FUNKA KOGYO CO., LTD.) were blended and stirred/mixed using a mixer to obtain a resin composition B-1 for forming a first porous sub-layer (B1).

<Second Porous Sub-Layer (B2)>

40 parts by mass of propylene homopolymer PP-1 (product name: MA3U, manufactured by Japan Polypropylene Corporation) and 60 parts by mass of heavy calcium carbonate powder F-1 (product name: SOFTON 1800, manufactured by BIHOKU FUNKA KOGYO CO., LTD.) were blended and stirred/mixed using a mixer to obtain a resin composition B-2 for forming a second porous sub-layer (B2).

<Formation-Supporting Sub-Layer (B3)>

30 parts by mass of propylene homopolymer PP-2 (product name: NOVATEC PP MA3H, manufactured by Japan Polypropylene Corporation), 21 parts by mass of propylene homopolymer PP-3 (product name: NOVATEC PP FY6H, manufactured by Japan Polypropylene Corporation), 4 parts by mass of high density polyethylene PE-1 (product name: NOVATEC HD HJ590N, manufactured by Japan Polyethylene Corporation), 45 parts by mass of heavy calcium carbonate powder F-1 (product name: SOFTON 1800, manufactured by BIHOKU FUNKA KOGYO CO., LTD.), and 0.5 parts by mass of oleic acid D-1 (product name: LUNAC O-V, manufactured by Kao Corporation) as a dispersant were blended and stirred/mixed using a mixer to obtain a resin composition B-3 for forming a formation-supporting sub-layer (B3).

Using an extruder set at 250° C., the above-described resin compositions B-1, B-2, and B-3 were melt-kneaded separately and then fed to an extrusion die. Then, these resin compositions were extruded into a trilayer sheet shape so that the films derived from the above-described resin compositions B-1, B-2, and B-3 were laminated in this order, and the resultant was layered on one face of the uniaxially stretched film in mechanical direction described above to thereby obtain a laminate having a tetralayer structure. At that time, the trilayer sheet was layered such that the film derived from the resin composition B-3 was brought into contact with the uniaxially stretched film in mechanical direction. By co-extruding the resin compositions B-1 and B-2 together with the resin composition B-3 into a sheet shape, a laminate was obtained stably.

The resulting laminate was reheated to 160° C. in an oven and then stretched 9 times in the cross direction using a tenter. Then, the resultant was heat-treated at 170° C. to obtain a stretched film having a tetralayer structure consisting of one biaxially stretched layer and three uniaxially stretched layers, which was used as the laminate of Example 1. In the laminate of Example 1, the biaxially stretched layer derived from the resin composition A-1 was a substrate layer (A); the uniaxially stretched layer derived from the resin composition B-1 and that from the resin composition B-2 were the first porous sub-layer (B1) and the second porous sub-layer (B2), respectively; and the uniaxially stretched layer derived from the resin composition B-3 was the formation-supporting sub-layer (B3).

The laminate of Example 1 had a thickness of 88 µm. In the laminate, the substrate layer (A) derived from the resin composition A-1 had a thickness of 43 µm and a grammage of 30 g/m². The sub-layers derived from the resin compositions B-1, B-2, and B-3 had thicknesses of 5 µm, 20 µm, and 20 µm, respectively, and the total thickness of these was 45 µm. The sub-layers derived from the resin compositions B-1, B-2, and B-3 had grammages of 2 g/m², 8 g/m², and 20 g/m², respectively, and the total grammage of these was 30 g/m².

Examples 2 to 6, Comparative Examples 1 to 5

The laminates of Examples 2 to 6 and Comparative Examples 1 to 5 were obtained in the same manner as in Example 1, except that the blending ratio of the materials in the resin compositions B-1 and B-2 used in Example 1 was changed as shown in Table 3. Each layer or sub-layer in the laminate was formed such that the layer or sub-layer had the same grammage as in Example 1.

Example 7

The laminate of Example 7 was obtained in the same manner as in Example 1, except that the calcium carbonate powder F-1, which had not been surface-treated, used in the resin composition B-2 in Example 1 was changed to the calcium carbonate powder F-2, which had been amine-modified by surface treatment. Each layer or sub-layer in the laminate was formed such that the layer or sub-layer had the same grammage as in Example 1.

Comparative Example 6

The laminate of Comparative Example 6 was obtained in the same manner as in Comparative Example 5, except that 20 parts by mass of the high density polyethylene PE-2 (product name: NOVATEC HD HJ490, manufactured by Japan Polyethylene Corporation) was added to the resin composition B-2 in Comparative Example 5, and that the amount of heavy calcium carbonate powder F-1 blended was changed to 60 parts by mass. Each layer in the laminate was formed such that the layer had the same grammage as in Example 1.

Examples 8 to 12

The laminates of Examples 8 to 12 were obtained in the same manner as in Example 1, except that the grammage of the sub-layer derived from the resin composition B-1 or the sub-layer derived from the resin composition B-2 in Example 1 was changed to the value shown in Table 4.

Example 13

An aqueous solution was prepared that contained polyoxyethylene alkyl ether (product name: ID-60, manufactured by SANYO CHEMICAL INDUSTRIES, LTD.) as a penetrant in an amount of 2.0 mass % in terms of solids content.

The resulting aqueous penetrant solution was applied to the surface of the first porous sub-layer (B1) of the laminate obtained in Example 1 with a roll coater such that the weight of the coating after drying was 0.2 g/m². Immediately after the application, the resultant was dried using a hot air fan drying system at 60° C. to form a penetrant layer, thereby obtaining a laminate of Example 13.

Comparative Example 7

A penetrant layer was formed in the same manner as in Example 13 to obtain a laminate of Comparative Example 7, except that the laminate obtained in Comparative Example 3 was used.

[Evaluation]

The following evaluations were carried out on the laminates of Examples and Comparative Examples.
<Porosity>

The porosity (%) of each of the first porous sub-layer (B1) and the second porous sub-layer (B2) was measured. In the measurement of the porosity, the ratio of the area occupied by pores was determined in a certain region of a cross-section of the porous sub-layer observed under an electron microscope as described above.
<Cobb absorptiveness>

The Cobb absorptiveness was measured in accordance with the specification of JIS P 8140:1998.

The test solvent used was not water but a 70 mass % ethanol aqueous solution, and the contact time was 120 seconds.
<Ink dryness>

For the purpose of evaluation of the ink-jet printability, the ink dryness was evaluated in the following manner.

A pictorial pattern of N5 in accordance with JIS X9201: 2001 (high-definition color digital standard image (CMYK/SCID)) was printed by ink-jet technique on the surface on the first porous sub-layer (B1) side of each of the laminates of Examples and Comparative Examples. A printer for aqueous pigmented ink-jet printing (model number: TM-C3500, manufactured by SEIKO EPSON CORPORATION) and aqueous cyan, magenta, yellow and black pigmented inks that were standard for that printer (item number: SJIC22) were used for printing.

The state of the ink on the printed image immediately after printing using the ink-jet printer was visually observed, and tissue paper was pressed against the printed image immediately after printing. The drying property of the ink was determined in the following manner. «Evaluation Criteria»

AA (Excellent): immediately after dropping ink on the surface, the ink in the form of a liquid is not found visually, and the ink is not transferred to paper at all when the paper is even lightly pressed thereon.

A (Very Good): after dropping ink on the surface, the ink dries within a lapse of at most 5 seconds, and the ink is not transferred to paper at all when the paper is even lightly pressed thereon.

B (Good): after dropping ink on the surface, the ink dries within a lapse of more than 5 seconds and at most 10 seconds, and the ink is not transferred to paper at all when the paper is even lightly pressed thereon.

C (Fair): after dropping ink on the surface, the ink dries within a lapse of more than 10 seconds and at most 30 seconds, and the ink is slightly transferred to paper when the paper is even lightly pressed thereon.

D (Poor): the ink in the form of a liquid is found visually on the surface even after a lapse of 30 seconds, and the whole of the ink is transferred to paper when the paper is lightly pressed thereon.

<Print Performance>

Printing was performed on the laminate in accordance with BS5609 in the same manner as in the evaluation of <Ink Dryness>, and then a tape-peeling test and an abrasion test in salt water were carried out to evaluate the print performance of the laminate after printing (resistance to print removal and abrasion resistance).

<Resistance to Print Removal>

The laminate after printing (sample) was kept in an environment at 23° C. and 50% RH for 24 hours, and thereafter, the tape-peeling test was carried out in accordance with BS5609. In the tape-peeling test, transparent tape defined in BS5609, specifically, transparent tape having a width of 25 mm and a peeling strength of 3.4 to 5.4 N/25 mm was firmly adhered to the print surface and left stand for 15 seconds. The tape was quickly peeled in a direction of 90°. The color fastness of the printed area was determined using a gray scale for this particular purpose, and the resistance to print removal was evaluated on the following evaluation criteria.

«Evaluation Criteria»

AA (Excellent): the color fastness after peeling the tape is 4.5 or more for each color.

A (Very Good): the color fastness after peeling the tape is 4 or more and less than 4.5 for each color.

B (Good): the color fastness after peeling the tape is 3.5 or more and less than 4 for each color.

C (Fair): the color fastness after peeling the tape is 3 or more and less than 3.5 for each color.

D (Poor): the color fastness after peeling the tape is less than 3 for each color.

<Abrasion Resistance>

An abrasion resistance test in salt water was carried out using a scratch tester (product name: Model QT12, manufactured by LORTONE, INC,) in accordance with NS5609: 1986. Specifically, by using a commercially available adhesive with a separator, the pressure-sensitive adhesive layer was transferred to the face on the side opposite from the printed side of the laminate after printing, to thereby prepare an adhesive label. 442 g of sea sand (particle diameter: 300 to 500 μm) and 1770 g of clean water were placed in a tumbler (drum) of the tester having a diameter of 170 mm and a height of 195 mm. The adhesive label (in the form of a cut piece having a length of 85 mm and a width of 60 mm) was wound onto a hollow bar made of SUS (stainless steel) 304 (length: 190 mm, diameter: 25 mm), and the resultant was set in the tumbler of the tester. After 500 rotations at 25 rpm/min (20 minutes), the printed material was taken out, followed by rinsing away the sand and wiping water out, and the abrasion resistance was evaluated on the following evaluation criteria. «Evaluation Criteria»

The adhesion (abrasion resistance) of the printed layer was evaluated on the basis of the found removal of the printed layer of each color using a gray scale for this particular purpose in comparison with a blank before the abrasion test. The evaluation criteria were based on BS1006-A02C: 1978, and are as follows.

A (Very Good): print removal was almost not found after the test, and the color fastness after the test is 4 or more.

B (Good): letters are readable after the test, and the color fastness after the test is 3 or more and less than 4.

C (Fair): letters are readable after the test, and the color fastness after the test is 2 or more and less than 3.

D (Poor): after the test, letters are unreadable or the color fastness is less than 2.

<Blurring Resistance>

The blurring resistance was evaluated in aqueous ink-jet printing on the surface of the first porous sub-layer (B1) side of the laminate obtained in each of Examples 1 and 13 and Comparative Examples 3 and 7. A pattern of black cross lines with a width of 5.0 mm in 100% yellow background was printed using a printer for aqueous pigmented ink-jet printing (model number: TM-C3500, manufactured by SEIKO EPSON CORPORATION) with aqueous yellow and black pigmented inks that were standard for that printer (item number: SJIC22). After printing, the printed image was left stand for one day or more, and the width of the black lines in the printed image was measured. The blurring was rated in the following manner.

«Evaluation Criteria»

A (Very Good): Among the black cross lines, a straight line with noticeable blurring has a thickness of 6.0 mm or less.

B (Good): Among the black cross lines, a straight line with noticeable blurring has a thickness of more than 6.0 mm and 7.0 mm or less.

C (Fair): Among the black cross lines, a straight line with noticeable blurring has a thickness of more than 7.0 mm and 8.0 mm or less.

D (Poor): Among the black cross lines, a straight line with noticeable blurring has a thickness of more than 8.0 mm.

The evaluation results are shown in Tables 3, 4, and 5. In Comparative Examples 2 and 5, the filler content of the first porous sub-layer (B1) or the second porous sub-layer (B2) was too large to form a laminate, and evaluation was thus impossible.

TABLE 3

| | First Porous Sub-Layer (B1) | | | | Second Porous Sub-Layer (B2) | | | | | Formed resin layer (B) | Evaluation Results | | |
|---|---|---|---|---|---|---|---|---|---|---|---|---|---|
| | PP-1 [Parts by Mass] | PE-2 [Parts by Mass] | F-1 [Parts by Mass] | Porosity [%] | PP-1 [Parts by Mass] | PE-2 [Parts by Mass] | F-1 [Parts by Mass] | F-2 [Parts by Mass] | Porosity [%] | Cobb Absorptiveness [cc/m²] | Ink Dryness | Resistance to Print Removal | Abrasion Resistance |
| Ex. 1 | 20 | 20 | 60 | 70 | 40 | — | 60 | — | 60 | 15 | A | A | A |
| Ex. 2 | 25 | 25 | 50 | 40 | 40 | — | 60 | — | 60 | 14 | B | B | A |
| Ex. 3 | 14 | 14 | 72 | 80 | 40 | — | 60 | — | 60 | 16 | A | A | B |
| Ex. 4 | 35 | 5 | 60 | 65 | 40 | — | 60 | — | 60 | 15 | A | B | A |
| Ex. 5 | 20 | 20 | 60 | 70 | 50 | — | 50 | — | 40 | 10 | C | A | A |
| Ex. 6 | 20 | 20 | 60 | 70 | 28 | — | 72 | — | 70 | 20 | A | C | B |
| Ex. 7 | 20 | 20 | 60 | 70 | 40 | — | — | 60 | 60 | 15 | A | A | A |
| Comp. Ex. 1 | 30 | 30 | 40 | 15 | 40 | — | 60 | — | 60 | 9 | D | C | A |
| Comp. Ex. 2 | 10 | 10 | 80 | 80 | 40 | — | 60 | — | 60 | — | — | — | — |
| Comp. Ex. 3 | 5 | 0 | 60 | 60 | 40 | — | 60 | — | 8 | 16 | A | D | A |
| Comp. Ex. 4 | 20 | 20 | 60 | 2 | 60 | — | 40 | — | 30 | 7 | D | A | A |
| Comp. Ex. 5 | 20 | 20 | 60 | 70 | 20 | — | 80 | — | 80 | — | — | — | — |
| Comp. Ex. 6 | 20 | 20 | 60 | 70 | 20 | 20 | 60 | — | 70 | 20 | A | D | C |

TABLE 4

| | Ex. 1 | Ex. 8 | Ex. 9 | Ex. 10 | Ex. 11 | Ex. 12 |
|---|---|---|---|---|---|---|
| First Porous Sub-Layer (B1) Grammage [g/m²] | 2 | 5 | 5 | 5 | 8 | 10 |
| Second Porous Sub-Layer (B2) Grammage [g/m²] | 8 | 8 | 10 | 5 | 8 | 8 |
| Ink Dryness | A | A | AA | B | A | AA |
| Resistance to Print Removal | A | AA | AA | AA | AA | B |
| Abrasion Resistance | A | A | A | A | A | A |

TABLE 5

| | First Porous Sub-Layer (B1) | | | | Second Porous Sub-Layer (B2) | | | | | | Evaluation Results | |
|---|---|---|---|---|---|---|---|---|---|---|---|---|
| | PP-1 [Parts by Mass] | PE-2 [Parts by Mass] | F-1 [Parts by Mass] | Porosity [%] | PP-1 [Parts by Mass] | PE-2 [Parts by Mass] | F-1 [Parts by Mass] | F-2 [Parts by Mass] | Porosity [%] | Penetrant Layer | Blurring Resistance | |
| Ex. 1 | 20 | 20 | 60 | 70 | 40 | — | 60 | — | 60 | No | B | |
| Ex. 13 | 20 | 20 | 60 | 70 | 40 | — | 60 | — | 60 | Yes | A | |
| Comp. Ex. 3 | 40 | 0 | 60 | 60 | 40 | — | 60 | — | 60 | No | B | |
| Comp. Ex. 7 | 40 | 0 | 60 | 60 | 40 | — | 60 | — | 60 | Yes | C | |

As shown in Tables 3 and 4, the laminates obtained in the inventive examples were all excellent in the ink dryness, the resistance to print removal, and the abrasion resistance.

On the other hand, in Comparative Example 1, the filler content of the first porous sub-layer (B1) was too small, resulting in a small porosity, and accordingly the ink dryness was insufficient.

In Comparative Example 3, since the first porous sub-layer (B1) contained no incompatible resin, the brittleness of the first porous sub-layer (B1) and that of the second porous sub-layer (B2) were at almost the same level, and accordingly, the printed area was peeled together with the second porous sub-layer (B2) in the test for the resistance to print removal. In Comparative Example 6, since the second porous sub-layer (B2) also contained an incompatible resin, pores in the second porous sub-layer (B2) were large in the thickness direction, and accordingly the layer itself was brittle. Accordingly, the second porous sub-layer (B2) was peeled in the test for resistance to print removal. Thus, these laminates both had insufficient color fastness.

In Comparative Example 4, the filler content of the second porous sub-layer (B2) was too small, resulting in a small porosity, and accordingly the ink dryness was insufficient.

As shown in Table 5, the laminate obtained in Example by applying a penetrant to the surface thereof and drying it exhibited the effect of suppressing the blurring of the printed image. On the other hand, as clear from the evaluation results of Comparative Examples 3 and 7, the laminate having the first porous sub-layer (B1) not containing an ethylene-based polymer or acrylonitrile-butadiene-styrene copolymer did not exhibit the effect of suppressing the blurring of the printed image even when a penetrant was applied to the surface thereof and dried.

The present application claims priority to Japanese Patent Application No. 2020-195564 filed on Nov. 25, 2020, the content of which is incorporated herein by reference in its entirety.

INDUSTRIAL APPLICABILITY

The laminate, the ink-jet printable paper, and the adhesive label in the present disclosure are particularly suitable for aqueous ink-jet printing, and provide a printed material excellent in water resistance and abrasion resistance. Particularly, they have abrasion resistance in accordance with BS5609: 1986, and are thus very useful for application to GHS labels.

REFERENCE SIGNS LIST

1: thermoplastic resin film
A: substrate layer
B: resin-formed layer
B1: first porous sub-layer
B2: second porous sub-layer
B3: formation-supporting sub-layer

The invention claimed is:

1. A laminate comprising a substrate layer (A) and a formed resin layer (B),
wherein
the substrate layer (A) comprises a thermoplastic resin film,
the formed resin layer (B) comprises a first porous sub-layer (B1) and a second porous sub-layer (B2),
the substrate layer (A), the second porous sub-layer (B2), and the first porous sub-layer (B1) are laminated in this order,
the first porous sub-layer (B1) comprises a propylene-based polymer (d1), an ethylene-based polymer or acrylonitrile-butadiene-styrene copolymer as an incompatible resin, and a filler (e1),
a content of the incompatible resin in the first porous sub-layer (B1) is 10 mass % or more and 50 mass % or less,
a content of the filler (e1) in the first porous sub-layer (B1) is 50 to 75 mass %,
the second porous sub-layer (B2) comprises a propylene-based polymer (d2) and a filler (e2), and is free of an ethylene-based polymer and an acrylonitrile-butadiene-styrene copolymer, and
a content of the filler (e2) in the second porous sub-layer (B2) is 50 to 75 mass %.

2. The laminate according to claim 1, wherein the first porous sub-layer (B1) has a grammage of 0.5 to 10 g/m$^2$.

3. The laminate according to claim 1, wherein the second porous sub-layer (B2) has a grammage of 6.0 g/m$^2$ or more.

4. The laminate according to claim 1, wherein the formed resin layer (B) has a Cobb absorptiveness of 10 cc/m$^2$ or more as measured with a 70 mass % ethanol aqueous solution as a test solvent in accordance with specification of JIS P 8140:1998.

5. The laminate according to claim 1, comprising a penetrant layer on a surface of the formed resin layer (B).

6. The laminate according to claim 1, wherein the first porous sub-layer (B1) has a porosity of 40 to 90%.

7. The laminate according to claim 1, wherein the second porous sub-layer (B2) has a porosity of 40 to 90%.

8. The laminate according to claim 1, wherein the formed resin layer (B) further comprises a formation-supporting sub-layer (B3), and
the substrate layer (A), the formation-supporting sub-layer (B3), the second porous sub-layer (B2), and the first porous sub-layer (B1) are laminated in this order.

9. Ink-jet printable paper comprising the laminate according to claim 1.

10. An adhesive label comprising:
the laminate according to claim 1; and
a pressure-sensitive adhesive layer (C) on a face of the substrate layer (A) of the laminate opposite from the formed resin layer (B).

11. A laminate comprising a substrate layer (A) and a formed resin layer (B), wherein
the substrate layer (A) comprises a thermoplastic resin film,
the formed resin layer (B) comprises a first porous sub-layer (B1) and a second porous sub-layer (B2),
the substrate layer (A), the second porous sub-layer (B2), and the first porous sub-layer (B1) are laminated in this order,
the first porous sub-layer (B1) comprises a propylene-based polymer (d1), an ethylene-based polymer or acrylonitrile-butadiene-styrene copolymer as an incompatible resin, and a filler (e1),
a ratio between a content of the propylene-based polymer (d1) and that of the incompatible resin, propylene-based polymer (d1): incompatible resin, in the first porous sub-layer (B1) is 1:2 to 2:1,
a content of the filler (e1) in the first porous sub-layer (B1) is 50 to 75 mass %,
the second porous sub-layer (B2) comprises a propylene-based polymer (d2) and a filler (e2), and is free of an ethylene-based polymer and an acrylonitrile-butadiene-styrene copolymer, and
a content of the filler (e2) in the second porous sub-layer (B2) is 50 to 75 mass %.

* * * * *